United States Patent [19]

Nordgren

[11] 3,755,292

[45] Aug. 28, 1973

[54] CYANOETHYL ETHER OF GALACTOMANNAN GUM

[75] Inventor: Robert Nordgren, Minneapolis, Minn.

[73] Assignee: General Mills, Inc., Minneapolis, Minn.

[22] Filed: Dec. 23, 1969

[21] Appl. No.: 887,745

[52] U.S. Cl. ............................................ 260/209 R
[51] Int. Cl. ............................................ C07c 47/18
[58] Field of Search ................................ 260/209 R

[56] References Cited
UNITED STATES PATENTS 2,461,502  2/1949  Moe ................................ 260/209 R
3,068,220  12/1962  Touey et al. ..................... 260/209 R
3,467,647  9/1969  Benninga ......................... 260/209 R

*Primary Examiner*—Lewis Gotts
*Assistant Examiner*—Johnnie R. Brown
*Attorney*—Anthony A. Juettner and Jerome J. Jenko

[57] ABSTRACT

A cyanoethyl ether of a galactomannan gum having a degree of substitution of greater than 1.9 and process of preparing the same at reflux temperatures with the periodic addition of water to the reactants. The product is used in explosives and can be used to thicken some organic solvents.

10 Claims, No Drawings

CYANOETHYL ETHER OF GALACTOMANNAN GUM

This invention relates to galactomannan gums. More specifically, this invention relates to cyanoethyl ethers of galactomannan gums having a degree of substitution of at least 1.9 and a method of preparing the same.

The guar gums are soluble in water and form a very viscous solution so that they cannot be easily handled or stirred at concentrations above 2 percent. It is also known that cyanoethyl ethers of galactomannan gums are soluble in acrylonitrile and also form a very viscous solution that cannot be handled. Furthermore, it is well known in the art to react a galactomannan with acrylonitrile in the presence of aqueous sodium hydroxide to produce a cyanoethyl ether of a galactomannan gum. However, these prior art products as disclosed in U.S. Pat. No. 2,461,502 have limitations in the degree of substitution, (D.S.) of about 1.8 as a maximum. By D.S. as used herein is meant the average substitution of cyanoethyl ether groups per anhydro sugar unit. The prior art discloses the use of 2.8 to 6.6 moles of acrylonitrile per mole of gum, using 200 grams of gum per mole of gum.

The process for producing the prior art products was a precipitation method by dispersing the gum in an aqueous sodium hydroxide mixture and adding the acrylonitrile at 20°-40°C. and upon standing, the cyanoethyl ether of the galactomannan separates from the reaction mixture. The precipitate was filtered and washed with an organic solvent, usually methanol. Very large reactors were required relative to the amount of the galactomannan gum used. It has now been found that the product produced by the process disclosed herein is capable of producing a D.S. of at least 1.9 and at least twice the yield in the same size reaction vessel as used previously. Furthermore, the process does not require the use of methanol or other organic solvents to separate the product. It has now been found that by controlling the reaction conditions, it is possible to obtain products which were heretofore not achieved under the known processes.

When practicing this invention, water, acrylonitrile and the galactomannan gum are added to a reactor along with an alkali metal hydroxide. The galactomannan is present in an amount of 100 to 300 parts, preferably 150 to 250 parts, per 1,000 parts of reaction mixture. The water is present in a minimum amount of 100 parts by weight per 200 parts of gum. The acrylonitrile is present in an amount of 2 to 5 parts, preferably 2.5 to 3.5 parts by weight per part of gum. Therefore, the process of this invention uses acrylonitrile in an amount of 7.5 to 19 moles of acrylonitrile per mole of galactomannan gum and preferably about 11.3 moles of acrylonitrile per mole of gum wherein 1 mole of galactomannan is defined as 200 grams of galactomannan. The alkali metal hydroxide, preferably sodium hydroxide, is added with the water in a catalytic amount as an aqueous solution in a concentration of 0.75 to 1.25 percent to insure that the reaction is conducted under alkaline conditions. The reactants are stirred and heated to the reflux temperature and heating is continued until the mixture becomes very viscous, generally about 5 minutes of heating time. Sufficient water, preferably 0.25 to 1.0 parts per part of galactomannan, is added to the heated solution to partially precipitate the reaction mixture and the mixture is heated until the viscosity is substantially the same as prior to the water addition. The procedure is repeated until the water added produces no substantial change in the viscosity of the mixture upon continued heating. The reaction mixture is then continuously heated for an additional period of time, preferably 15 minutes or greater, to insure completion of the reaction. Thereafter, the mixture is neutralized, preferably with acetic acid followed by the addition of water in an amount of 0.25 to 1.0 parts by weight of the acrylonitrile charged to the reactor. The mixture is heated and the excess acrylonitrile distilled off by gradually increasing the mixture temperature to the boiling point of water. The distillate which is obtained is comprised of two layers, an acrylonitrile-rich layer, i.e., up to 97 percent acrylonitrile, and a water layer, containing up to 7 percent acrylonitrile. The distillates removed can be used in the initial stages of the reaction. After distillation, the reactor is filled with water, stirred, and allowed to settle. Two layers are formed during the settling, the upper layer (which is turbid and brown) is decanted from the solids and the reactor again filled with water and stirred followed by settling. The upper layer is lighter in color than that obtained during the first settling. The procedure of decantation and the addition of water is continued until the upper layer is almost clear and colorless. The solids remaining in the lower layer are then filtered, dried and ground. The resulting product is a cyanoethyl ether of a galactomannan gum having a degree of substitution of 1.9 or greater. Other methods of recovering the cyanoethyl ether of galactomannan gum include centrifugation, filtration, etc.

As is indicated above, acrylonitrile is added to the reactants. However, substituted acrylonitriles may also be used such as methyl acrylonitrile, all of which are contemplated as being included in the term "an acrylonitrile" as used herein and in the claims. It has been found that higher acrylonitrile amounts can be used to give a higher D.S. product but is generally uneconomical and unnecessary since the optimum D.S. of 2-3 is obtained as disclosed herein.

As to the water added in the reactor, sufficient water must be included to allow the galactomannan gum, preferably guar, to swell slightly. At least 100 parts water should be used initially per 200 parts of the gum. After the cyanoethylation has started, sufficient water is necessary to prevent the product from dissolving in the acrylonitrile and producing a viscous solution which is too difficult to process.

The alkali metal hydroxides are present as disclosed above. Sodium hydroxide is the preferred hydroxide. However, other alkali metal hydroxides can also be used. If the amount of the alkali metal hydroxide is increased 50 percent, up to 1.5 parts per 100 parts of gum, the additional hydroxide will cause some of the acrylonitrile to polymerize. Decreasing the hydroxide by 50 percent slows the reaction rate.

The galactomannan used is preferably guar. The addition of 50 percent more guar will result in too viscous a mixture to stir and cannot be thinned out with water. The gums useful within the scope of this invention are the galactomannans which are polysaccharides comprised primarily of galactose and mannose units. The galactomannans are found in the endosperms of leguminous seeds such as guar, locust bean, honey locust, flametree, and the like. However, guar flour is readily commercially available and most desirable from an economic and processing standpoint.

Time and temperature of the reaction are not critical but generally lower temperatures require longer reaction times. Under the conditions disclosed herein, the reaction is generally completed within 1 hour. If higher temperatures are used, there is the danger of polymerizing the acrylonitrile.

The products produced by the process disclosed herein are suitable for use in explosives, forming films, and a variety of other uses apparent to those skilled in the art.

As is disclosed above, the process of this invention greatly enhances the yield of the product obtained and does not require the use of methanol and other organic solvents.

The product of this invention has a number of other advantages. For instance, cellulose nitrate is explosive and very flammable when in the dry state and high risk is involved when mixing cellulose nitrate with certain organic solvents. Cyanoethyl galactomannan gums are safe to handle in either a dry or a wet state. They offer the further advantage of having greater thickening capacity for certain organic solvents. Other advantages will be readily apparent to those skilled in the art.

The following examples will further illustrate the embodiments of this invention but are not intended to limit the scope thereof.

EXAMPLES I–IV

The following reactants were added to a 3-liter flask which was fitted with a tetrafluoroethylene fluorocarbon resin half-moon stirrer which was adjusted so that it almost scraped the bottom of the flask:

Acrylonitrile 600 grams

Commercially available guar flour (1 equiv.) 200

Sodium hydroxide 2

Water 200

The sodium hydroxide was dissolved in the water before addition to the flask. The reactants were stirred and heated to the reflux temperature of 71°C. and heating was continued until the reaction mixture became very viscous, about 5 minutes. Water, in an amount of 100 milliliters was then added to partially precipitate the reaction mixture and the mixture was heated for another 5 minutes during which time the reaction mixture thickened. A second water addition of 100 milliliters followed by heating was carried out as above. The procedure was continued for a total of six times and until the total of 600 milliliters of water was added, all with continued heating at 71°C. After the sixth addition of the water, no further thickening was evident. The total time of the reaction was approximately 1 hour, and the temperature varied from 67°–71°C. The reaction was continued for an extra 30 minutes before the excess sodium hydroxide was neutralized with 1.5 grams of acetic acid. Water, in an amount of 300 milliliters, was added to the neutralized mixture. The water and the unreacted acrylonitrile were then distilled off until the pot temperature rose to 100°C. The distillate obtained was composed of two layers, an upper layer of approximately 97 percent acrylonitrile and 3 percent water and a lower water layer that contained up to 7 percent acrylonitrile. The acrylonitrile obtained from the distillation can then be used in the next batch. After the distillation, the flask was filled with water, stirred for 3 minutes and allowed to settle. After 15 minutes of settling, the upper layer which was turbid and brown was decanted from the light solids. The flask was again filled with water and stirred for an additional 3 minutes followed by settling for 15 minutes. The upper layer was only slightly turbid and slightly colored and was decanted off. The flask was filled a third time, mixed for a few minutes and then settled for 15 minutes before decanting off the upper layer, which was almost clear and colorless. The remaining solids were slurried with a little water, filtered through on a Buchner funnel and then dried overnight in an air oven at 50°C. The dried product was ground in a Waring blender to pass a 30-mesh screen. The data on the four products produced by this process are summarized in the following table:

TABLE I

| Example No. | Yield | Water Content | D.S. |
|---|---|---|---|
| I | 265 gm. | 0.8% | 1.98 |
| II | 268 gm. | 0.6% | 2.08 |
| III | 280 gm. | 0.8% | 2.08 |
| IV | 273 gm. | 0.4% | 2.25 |

The D.S. was determined from an analysis of the nitrogen content of the dried product. The nitrogen content was determined by conventional Kjeldahl procedure.

EXAMPLES V–VI

The following reactants were added to a 70-gallon reactor:

Acrylontrile 105 lbs.

Commercially available guar flour 35

Water 35

Sodium hydroxide 0.35

The water and sodium hydroxide were mixed to give an aqueous sodium hydroxide solution prior to addition to the other two reactants. The reactants were stirred and heated under reflux at 70°–71°C. for 8 minutes at which time the reaction mass became quite viscous. Water, in an amount of 17.5 lbs., was pumped into the reactor and the reaction continued for 5 minutes. After 5–8 minutes more refluxing, the reaction again thickened and the reactants were again thinned by adding 17.5 lbs. of water. This was repeated until a total of five 17.5 lb. portions of water had been added. The reaction mixture remained fluid during the final 45 minutes of refluxing. Total reaction time at 70°C. was 1 hour and 35 minutes. After completion of the reaction, 0.26 lbs. of acetic acid and 52.5 lbs. of water were added to neutralize the remaining sodium hydroxide. The unreacted acrylonitrile and water was distilled off by gradually raising the product temperature to 98.5°C. The reactor was filled with water, mixed for a few minutes, and allowed to settle. The water layer was siphoned from the cyanoethyl guar layer which had settled to the bottom. The procedure was repeated three times until finally the aqueous layer was a clear colorless layer. The precipitated product was slurried with enough water to allow it to flow through a filter where most of the water was removed. The filtered product was placed in a vacuum oven and dried at 50°C. for 16 hours. The dried product was then ground to pass a 30-mesh screen. The reaction was repeated under the same conditions. The data on these two runs is as follows:

TABLE II

| Example No. | Water Content | D.S. |
|---|---|---|
| V | 1.2% | 2.13 |
| VI | 2.4% | 1.98 |

EXAMPLE VII

The procedure of Examples I–IV was repeated except that 200 grams of commercially available locust bean flour was used in place of the guar. The cyanoethyl ether of locust bean gum had a D.S. of 1.98, a water content of 0.8 percent and a yield of 259 grams.

The embodiments of this invention in which an exclusive property or privilege is claimed are defined as follows:

1. In a process of preparing a cyanoethyl ether of galactomannan gums wherein a galactomannan gum is reacted with acrylonitrile, the improvement consisting of
   a. heating an alkaline mixture of galactomannan gum, water, and acrylontrile, the galactomannan gum being present in an amount of 100 to 300 parts per 1,000 parts of reaction mixture, the water being present in a minimum amount of 100 parts of water per 200 parts of gum and the acrylonitrile being present in an amount of 2 to 5 parts per part of gum, said heating conducted at reflux for a period of time sufficient for the mixture to become very viscous,
   b. thinning the mixture by adding water in an amount of about 0.25 to 1.0 parts of water per part of galactomannan gum,
   c. continued heating at reflux until the mixture becomes very viscous, and
   d. repeating steps (b) and (c) until there is no substantial increase in viscosity, and a cyanoethyl ether of galactomannan gum having a D.S. of 1.9 to 3 is produced.

2. A process as in claim 1 wherein the reflux temperature is maintained at 67°–71°C.

3. A process as in claim 1 wherein the mixture is made alkaline by the addition of an alkali metal hydroxide to the initial water in the mixture whereby the concentration of the hydroxide in the water is about 0.75 to 1.25 percent.

4. A process as in claim 1 wherein any excess of acrylonitrile is removed from the reaction mixture.

5. A process as in claim 4 wherein the excess acrylonitrile is removed by distillation.

6. A process as in claim 1 wherein the cyanoethyl ether of the galactomannan gum is recovered as a precipitate.

7. A process as in claim 6 wherein the precipitate is dried.

8. A process as in claim 1 wherein the acrylonitrile is present in an amount of 2.5 to 3.5 parts per part of galactomannan gum.

9. A process as in claim 1 wherein the galactomannan gum is guar.

10. A process as in claim 1 wherein the galactomannan gum is locust bean gum.

* * * * *